INVENTORS.
ALEXANDER H. MARK &
DAVID R. KNICELY
BY
Tweedale & Gerhardt
ATTORNEYS INVENTORS.
ALEXANDER H. MARK &
DAVID R. KNICELY
BY Tweedale & Gerhardt
ATTORNEYS March 11, 1969  A. H. MARK ET AL  3,431,713

CROP HARVESTING AND DEWATERING MACHINE

Filed Oct. 5, 1966  Sheet 3 of 3

INVENTORS.
ALEXANDER H. MARK &
DAVID R. KNICELY
BY
Tweedale & Gerhardt
ATTORNEYS.

3,431,713
CROP HARVESTING AND DEWATERING MACHINE
Alexander H. Mark and David R. Knicely, Livonia, Mich., assignors to Massey-Ferguson Inc., Detroit, Mich.
Filed Oct. 5, 1966, Ser. No. 584,556
U.S. Cl. 56—23                                5 Claims
Int. Cl. A01d *43/00, 35/00;* B30b *9/14*

This invention relates to harvesting machinery for forage crops such as hay, maize and alfalfa, and provides a machine to cut, process and deliver to an accompanying wagon a material in suitable form for storage in a silo with a minimum deterioration rate. Heretofore, the harvesting of legumes and grasses has involved curing of the cut crop, either by leaving it on the field or by artificially drying it. In either case, time must be allowed for the curing or drying and either a second trip over the field or a large consumption of heating fuel is involved in order to produce a high quality silage.

Furthermore, a large percentage, as high as even 40%, of field cured crop is not picked up by the known pick-up devices but is left on the field in the form of small particles of shattered leaves and the like.

The present invention overcomes these difficulties by treating the cut crop in a field machine which, through mechanical pressure, extracts sufficient of the moisture content of the crop to reduce the crop to a sufficiently low moisture content that safe storage with minimum deterioration under silo conditions is assured. This end is achieved by the provision of a wheeled chassis frame suitable to be propelled along the ground, and carrying at its forward end a crop cutting and conveying unit having a discharge passage through which the cut crop is delivered to a crop chopper mounted on the frame adjacent the discharge passage. A crop dewatering unit consisting of a rotary screw press is mounted on the frame to receive the crop delivered from the chopping unit, and discharges dewatered crop to a conveyor mounted on the frame at the discharge end of the dewatering unit. A forage blower is also mounted on the frame at the delivery end of the last mentioned conveyor and carries a delivery chute through which the processed crop is blown into a accompanying wagon. The frame also carries appropriate power transmitting devices arranged to connect each of the units with a suitable prime mover.

In the drawings, FIGURE 1 is a plan view of a harvesting machine embodying a preferred form of the present invention;

Figure 1:
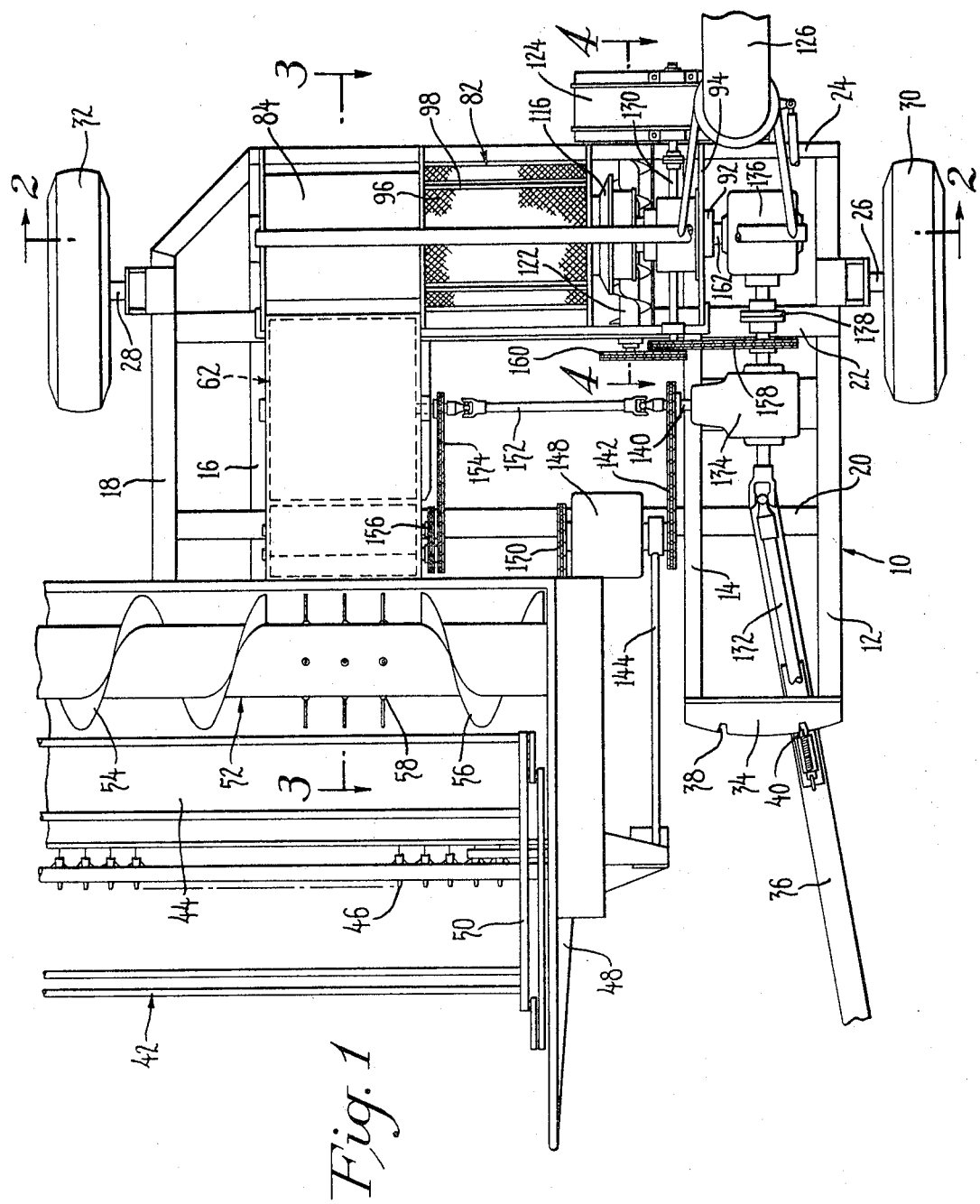

The harvesting machine illustrated comprises a frame 10 having a plurality of fore-and-aft stringers 12, 14, 16 and 18 joined by cross members 20, 22 and 24. The stringers 12 and 18 are supported upon stub axles 26 and 28 provided with wheels 30 and 32. A front cross member 34 of arcuate form supports a tongue 36 pivoted at its rear end on cross member 20, and latchable to the member 34 in either of the two notches 38 and 40 for road transport and field operation respectively.

Figure 3:
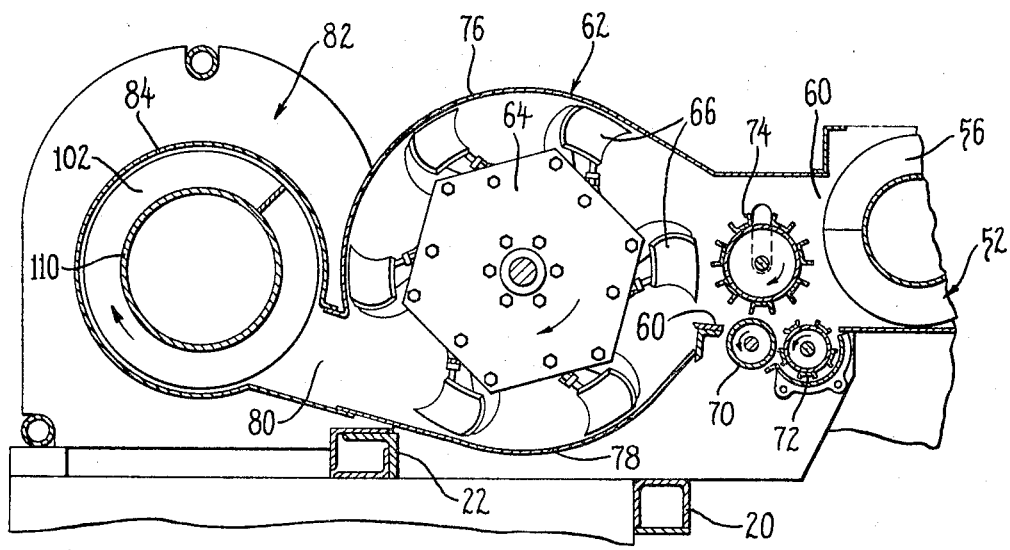
FIGURE 3 is a fragmentary sectional view taken on line 3:3 of FIGURE 1.
Figure 4:
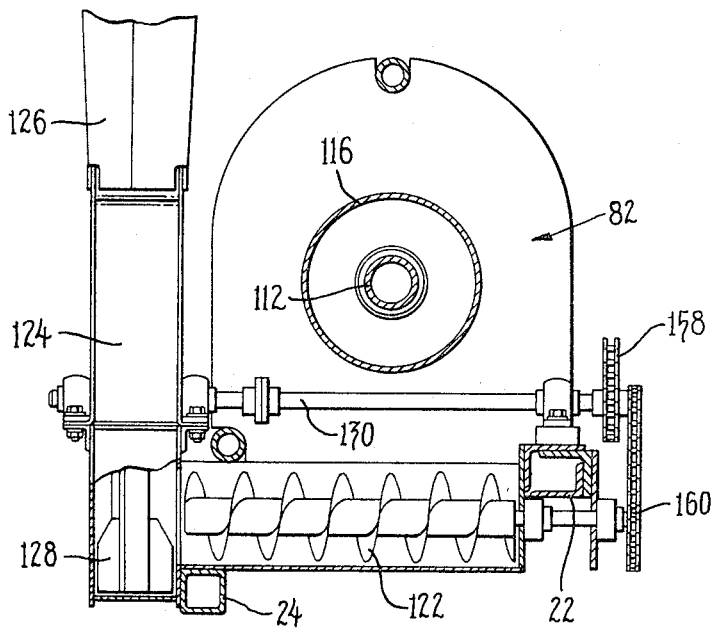
FIGURE 4 is a fragmentary sectional view taken on line 4:4 of FIGURE 1.

Mounted on the forward end of the frame 10 is a crop cutting and conveying unit 42, which may be of conventional form, comprising a table 44 at the forward end of which is a mower bar 46. At its ends the unit 42 has divider structures 48 which support a pick-up reel 50. At the rear of table 44 a crop conveyor 52 is provided consisting of left and right hand auger sections 54 and 56 separated by a retractable finger feeder section 58 whereby crop may be delivered to a rectangular discharge passage indicated in FIGURE 3 at 60.

Behind the discharge passage 60 there is mounted on the frame a crop chopper 62, also of conventional form, comprising a rotary drum 64 carrying a plurality of knives 66 which cut crop against a stationary shear bar 68. The chopper includes an infeed mechanism comprising lower feed rollers 70 and 72 and a floating upper feed roller 74. The rotary drum 64 is enclosed by a housing 76 having a lower curved portion 78 along which the chopped crop is propelled toward a discharge opening 80.

Figure 2:
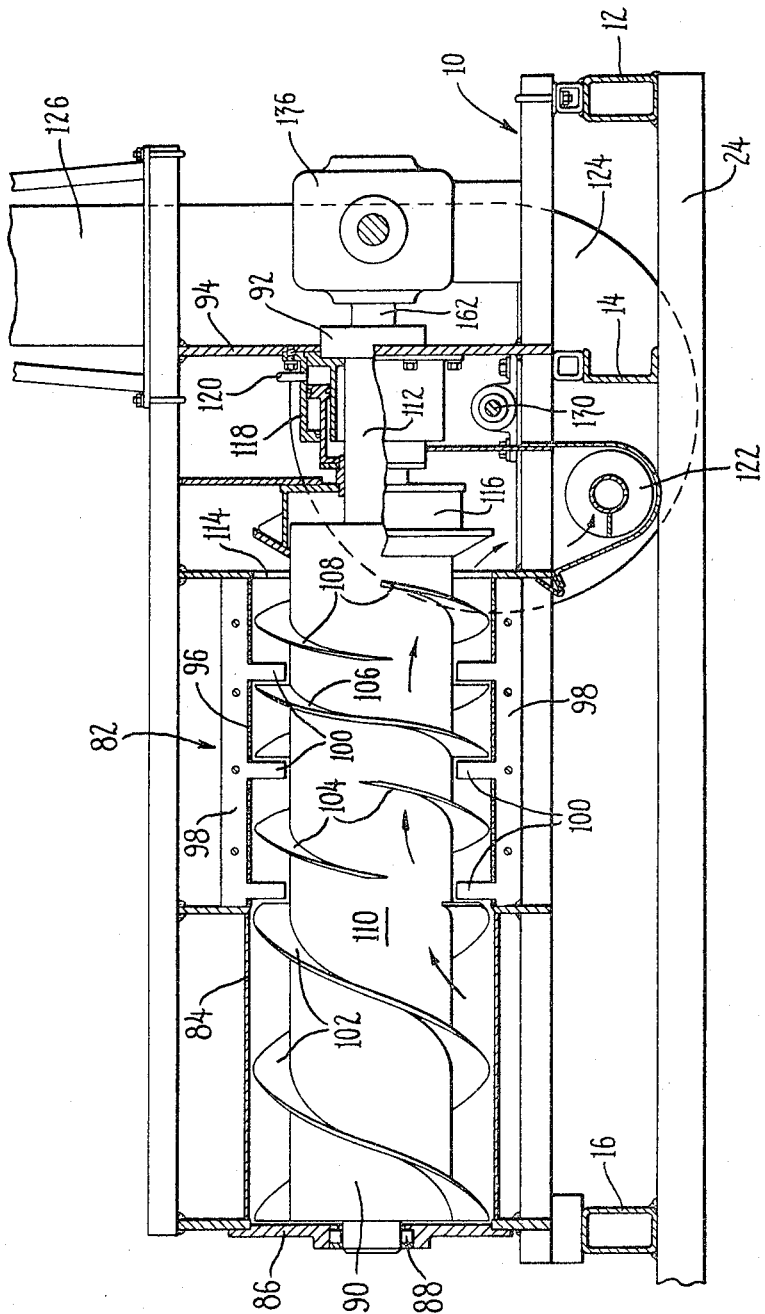
FIGURE 2 is a fragmentary sectional view taken on line 2:2 of FIGURE 1.

Immediately behind the chopper 62 a dewatering press 82 is mounted on the frame 10 in a transverse direction. The press 82 is of conventional form having an interrupted cylindrical intake housing 84 into which the discharge opening 80 leads. An end plate 86 provides a journal 88 for one end of a rotary screw 90 the other end of which is journaled at 92 in an end plate 94 (see FIGURE 2). The press 82 also includes a cylindrical screen section 96 which includes a plurality of comb bars 98 spaced around the circumference of the screen and having inwardly projecting fingers 100. The press screw 90 has a plurality of pairs of helical flights 102, 104, 106 and 108, rigidly secured about the periphery of a cylindrical core 110 mounted upon the main shaft 112 which is journaled in bearings 88 and 92. The auger flights are separated from each other sufficiently to allow them to clear the projecting comb fingers 100.

The right hand end of the cylindrical screen section 96 is open, as indicated at 114, to form an annular forage discharge passage and an axially slideable regulating cone valve 116 is mounted on shaft 112. An annular cylinder and piston assembly 118 surrounds shaft 112 and is connected to cone valve 116 to control its axial position. Fluid pressure from a suitable, adjustable constant pressure source, not shown, may be introduced through an inlet pipe 120.

Beneath the end opening 114 there is provided an auger and trough conveyor 122 for delivering toward the rear of the frame 10 the dewatered material discharged from the press 82. Mounted on the rear cross member 24 is a rotary forage blower 124, of conventional form, having an upwardly and rearwardly directed discharge chute 126. The blower 124 comprises suitable rotary paddle blades 128 mounted on a drive shaft 130.

Power to drive the various units mounted on the frame may be supplied either from a tractor power take-off shaft 132 or from an independent engine, not shown, and is delivered to a pair of right angle gear boxes 134 and 136 mounted in tandem behind the drive shaft 132 and connected by a shaft coupling 138. The gear box 134, which may have a relatively high speed output shaft 140, is connected by chain and sprocket 142 and pitman arm 144 with the mower bar 46 for reciprocating action. A reduction gear 148 and chain and sprocket drive 150 provide driving arrangements to reel 50.

Gear box 134 also drives the chopper 62 through a universally jointed shaft 152, and drives the feed rolls through chain and sprocket drives 154 and 156. The connecting shaft coupling 138 has chain and sprocket drives 158 and 160 which operate the forage blower 124 and the conveyor 122 respectively. The gear box 136 has a very low speed output shaft 162 directly connected with the main shaft 112 of the dewatering press 82.

In operation, with the tongue 36 in the notch 40 for field use and with a suitable tractor connected thereto and to the power take-off shaft 132, the machine may be drawn through a field of suitable forage crop which will be severed by the mower 46 and delivered by conveyor 52 through the discharge passage 60. Such crop will normally have a very high moisture content. The stream of cut crop will be positively fed by the feed rollers 70, 72 and 74 into chopper unit 62, where it is chopped into short lengths and delivered through the discharge opening 80 to the dewatering press 82. The chopped crop is delivered to the right in FIGURE 2 by the auger 90 and flights 102. The projecting fingers 100 and the successive auger flights 104, 106 and 108 serve to compress the crop sufficiently to expel through screen 96 a large portion of the moisture contained therein. The cone valve 116 is urged by the piston-cylinder assembly 118 toward the discharge opening 114 to maintain a high resistance against the mass of dewatered crop being propelled to the right by the auger flights 108. The discharged crop falls into the auger and trough conveyor 122 and is delivered to the forage blower 124, which propels the same upwardly and rearwardly through the discharge chute 126 into an accompanying wagon. Thus, in a single passage over the field the forage may be simultaneously harvested and processed into a dewatered condition suitable for protracted storage in a silo.

We claim the following:

1. A forage crop harvesting machine comprising a wheeled chassis frame, a crop cutting and conveying unit mounted on the fore part of the frame having a crop discharge passage, conveying means for propelling crop through the discharge passage, a crop chopper mounted on the frame to receive and chop crop delivered through the discharge passage, a dewatering device comprising a rotary screw type press mounted on the frame to receive chopped crop directly from the chopper, the device having a forage discharge passage at the end opposite the chopper, a forage blower mounted on the frame, means for transferring forage discharged from the dewatering device to the forage blower, a power input shaft and drive means between the power input shaft and the cutting and conveying unit, the chopper, the dewatering device and the blower.

2. The machine of claim 1 wherein the drive means includes two angular transmission gear sets arranged in tandem with the input shaft.

3. The machine of claim 2 wherein one gear set is connected to drive the chopper and the other gear set is connected to drive the press.

4. The machine of claim 1 wherein the crop discharge passage of the cutting and conveying unit faces rearwardly.

5. The machine of claim 1 wherein the screw type press is mounted transversely of the frame and to the rear of the chopper.

References Cited

UNITED STATES PATENTS

| | | | |
|---|---|---|---|
| 3,023,560 | 3/1962 | Krahn | 56—23 |
| 3,090,295 | 5/1963 | Crane et al. | 100—97 |
| 3,139,717 | 7/1964 | Fischer | 56—23 |
| 3,256,808 | 6/1966 | Hunt | 100—117 |
| 3,285,163 | 11/1966 | Burner | 100—96 |

ANTONIO F. GUIDA, *Primary Examiner.*

U.S. Cl. X.R.

100—96, 126